US012030077B2

(12) United States Patent
Boris

(10) Patent No.: US 12,030,077 B2
(45) Date of Patent: Jul. 9, 2024

(54) ELECTROSTATIC SPRAY HEAD ASSEMBLY

(71) Applicant: TRAVICAR TECNOLOGIA AGRÍCOLA LTDA, Porto Alegre (BR)

(72) Inventor: Felipe Andre Boris, Porto Alegre (BR)

(73) Assignee: Travicar Tecnologia Agricola Ltda (BR)

( * ) Notice: Subject to any disclaimer, the term of this patent is extended or adjusted under 35 U.S.C. 154(b) by 561 days.

(21) Appl. No.: 17/227,743

(22) Filed: Apr. 12, 2021

(65) Prior Publication Data

US 2022/0297142 A1 Sep. 22, 2022

(30) Foreign Application Priority Data

Mar. 16, 2021 (BR) .......................... 1020210049596

(51) Int. Cl.
*B05B 5/043* (2006.01)

(52) U.S. Cl.
CPC .................................... *B05B 5/043* (2013.01)

(58) Field of Classification Search
CPC ......... B05B 5/043; B05B 5/05; B05B 5/0533; B05B 5/0255; B05B 15/658
USPC ........................... 361/227–228; 239/690–708
See application file for complete search history.

(56) References Cited

U.S. PATENT DOCUMENTS

| | | | | | |
|---|---|---|---|---|---|
| 5,064,123 | A * | 11/1991 | Aiello | B05B 1/3053 | 239/128 |
| 5,176,321 | A * | 1/1993 | Doherty | F16N 15/00 | 239/3 |
| 5,647,543 | A * | 7/1997 | Ma | B05B 5/0533 | 239/706 |
| 8,016,213 | B2 * | 9/2011 | Altenburger | B05B 5/0532 | 239/690 |
| 2010/0001099 | A1 * | 1/2010 | Onda | B05B 7/066 | 239/302 |
| 2013/0068862 | A1 * | 3/2013 | Massey | B05B 5/085 | 239/690.1 |
| 2013/0239546 | A1 * | 9/2013 | Levin | F01N 3/2892 | 60/274 |
| 2016/0121080 | A1 * | 5/2016 | Cottone | A61M 25/0662 | 604/528 |
| 2020/0254467 | A1 * | 8/2020 | Marin | A01M 7/0092 | |

FOREIGN PATENT DOCUMENTS

| | | |
|---|---|---|
| BR | 202015023211-5 | 3/2017 |
| WO | 2017063065 A1 | 4/2017 |

* cited by examiner

*Primary Examiner* — Tuan T Dinh
(74) *Attorney, Agent, or Firm* — LaMorte & Associates, P.C.

(57) ABSTRACT

An electrostatic spray head assembly includes a finned rod for electrifying sprayed droplets, which employs a check valve, an angulator and a multiflow selector. The check valve is equipped with a first threaded nipple for attachment to the spray bar and liquid inlet. The finned rod has a fastener element that attaches the angulator to the multiflow selector. The angulator contains an angle adjusting screw.

10 Claims, 4 Drawing Sheets

ELECTROSTATIC SPRAY HEAD ASSEMBLY

TECHNICAL FIELD OF THE INVENTION

The following specification for the invention relates to the development of a constructive arrangement applied on finned rod for electrifying sprayed droplets, where these droplets are produced by means of spray nozzle and are electrified by means of the curved electrification arrangement, capable of optimizing the efficiency of the device in relation to load cleaning and stability.

For a better understanding of the contents of the specification, the following definitions will be employed for the following terms:

Fins: are surfaces that extend from the electrifying device in order to increase its insulating surface.

Curved finned rod: curved support containing the fins, where the induction electrode is fixed;

Induction electrode: metal ring responsible for electrifying the droplets, the droplets acquire the charge in the presence of an intense electrostatic field, formed between the induction electrode maintained at high voltage and the jet of droplets; and, Complete nozzle: construction arrangement that belongs to the state of the art and employs check valve (101), angulator (102) and multiflow selector (103).

DESCRIPTION OF THE STATE OF THE ART

According to Embrapa, electrostatic spraying has been presented as a technological solution to increase the efficiency of using small droplets, reducing losses to the soil or even by evaporation.

In the indirect electrostatic induction system, the liquid is subjected to zero voltage. When this liquid is sprayed and passes through the induction electrode, the droplets acquire a charge opposite to the electrode charge. Because they have opposite charges the droplets are attracted to the induction electrode causing their wetting and loss of efficiency.

To avoid this problem, electrostatic pneumatic nozzles have been developed, where the air itself that sprays the liquid drags the electrified droplets away from the induction electrode's zone of influence. This can be seen in US 20130068862 and WO 2017063065.

Other electrostatic sprayers, as in Brazilian document BR 102013011205-4, generate an electric field that polarizes droplets in hydraulic spray nozzles, whose spray nozzle manufactured in polymer of high chemical resistance, presents prolongation allowing the elongation of the induction ring, moving it away from the locking nut avoiding runoff and voltage loss by electric discharge, counting with inductor ring that is positioned at the base of the sprayed cone, being essential for the formation of the electric field and polarization of the sprayed droplets.

The use of fins in droplet electrification systems is important to prevent wetting and loss of induction electrode efficiency. An example of this type of device can be seen in Brazilian document BR 202015023211-5 which describes a spray nozzle equipped with coupling clamp on the bar (not shown), containing a sealing system arranged next to the clamp, in order to prevent leaks, the nozzle having an anti-protection system, with extension fins positioned vertically and with self-cleaning effect.

PROBLEMS OF THE STATE OF THE ART

Brazilian Patent document BR 202015023211-5 shows extension fins positioned vertically and with self-cleaning effect. It happens that the leading edge of the nozzle collides with the wind, cleaning only the first fin.

If the insulator does not present a clean and smooth surface, as occurs when there is dust deposited on it, its efficiency will decrease causing wetting and loss of insulation capacity.

PROPOSED SOLUTION

The curvature in the finned rod allowed the crossing of the wind by all fins, achieving greater cleaning of all fins and greater stability of the electrostatic charge on the electrode. Because it dries the surface faster, decreasing the accumulation of chemicals on the surface of the fins.

Another improvement implemented is the ability of the curved electrification arrangement to be installed on nozzles that are already used in agricultural aviation.

Thus, with the inclusion of the finned insulation rod, the user may remain with the original nozzles of the aircraft, only by adding to the flow circuit the insulation assembly for inclusion of the electrostatic charge.

DESCRIPTION OF THE DRAWINGS

The characterization of the present invention is done by means of representative drawings of the finned rod for electrifying sprayed droplets, such that product can be fully reproduced by suitable technique, allowing full characterization of the functionality of the claimed object.

From the elaborated figures that express the preferred way of performing the product now idealized, the descriptive part of the report is based, through a detailed and consecutive numbering, where it clarifies aspects that may be implied by the representation adopted, in order to clearly determine the protection intended herein.

These figures are merely illustrative and may present variations, as long as they do not escape the initially claimed.

Figure 1:
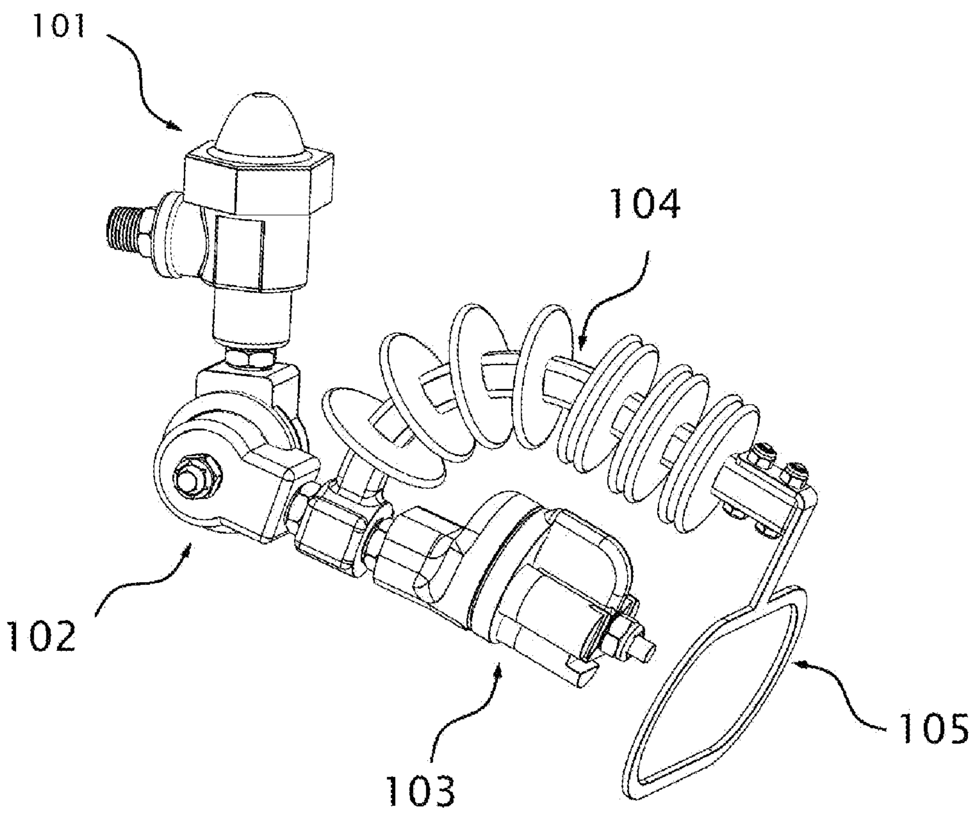
Figure 2:
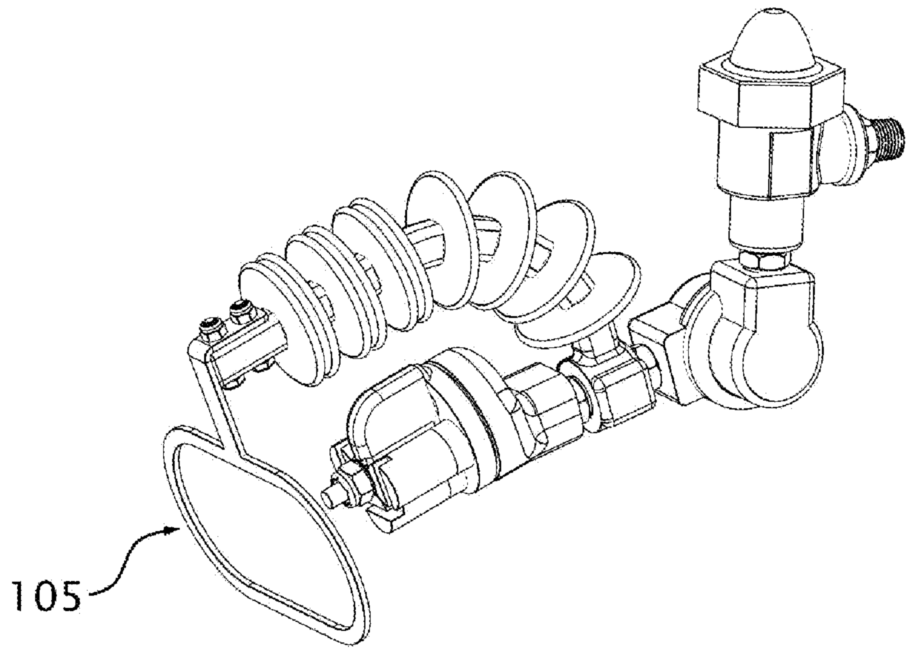
Figure 3:
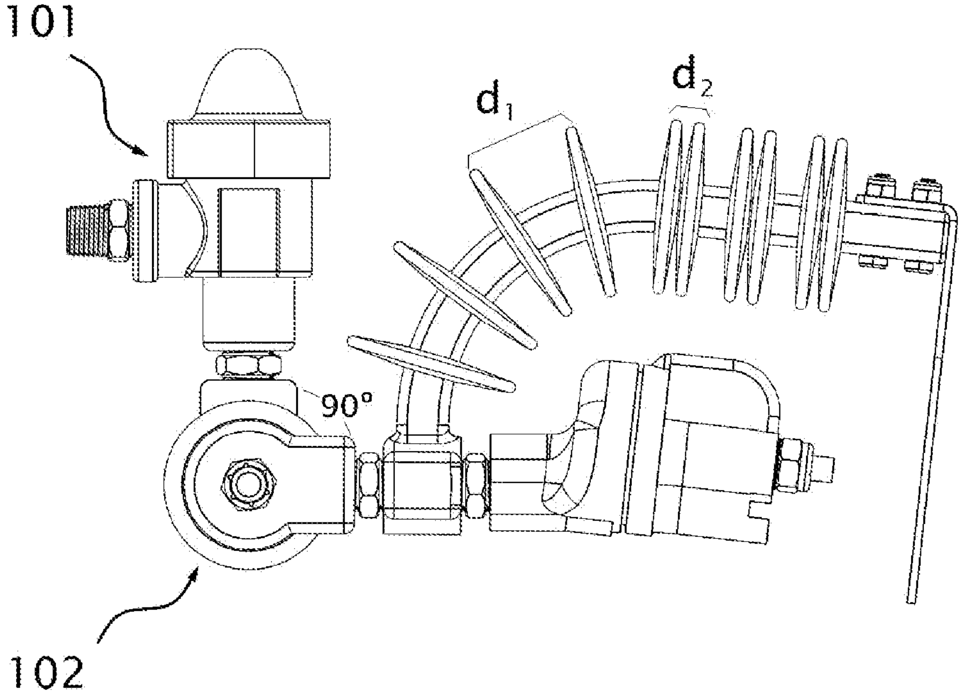
Figure 4:
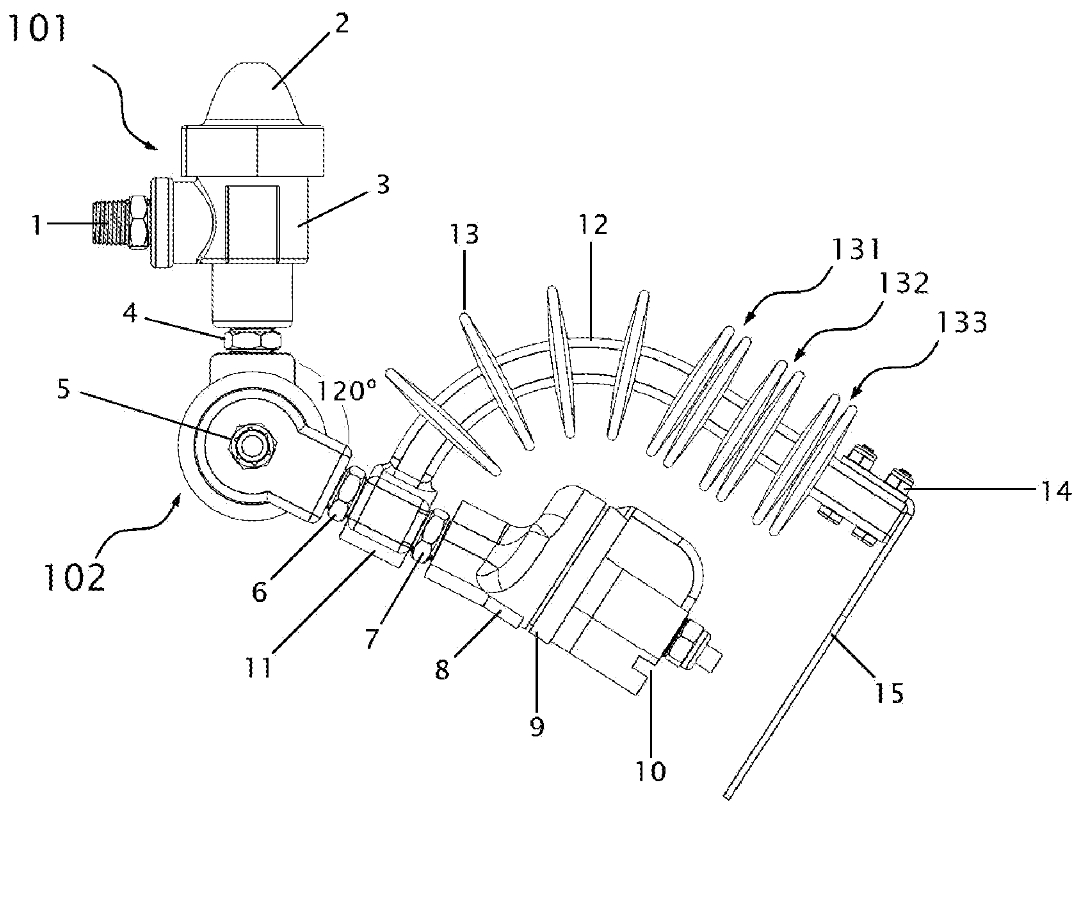

In this case, it follows that:

FIG. 1 show perspectives of a complete nozzle, containing check valve (101), angulator (102), multiflow selector (103) and curved finned rod (104) with induction ring (105);

FIG. 2 show perspectives of a complete nozzle, containing check valve (101), angulator (102), multiflow selector (103) and curved finned rod (104) with induction ring (105);

FIG. 3 shows a side view of the complete nozzle, where the angulator (102) has been positioned at a 90° angle with respect to the check valve (101); and, FIG. 4 shows a side view of the complete nozzle, where the angulator (102) has been positioned at a 120° angle with respect to the check valve (101).

DETAILED DESCRIPTION OF THE INVENTION

The check valve (101), angulator (102) and multiflow selector (103) are part of the state of the art and are not claimed elements. These devices are cited and represented because the object of the present utility model, namely the curved finned rod (104) and the induction ring (105) are inserted between the angulator (102) and the multiflow selector (103).

The best form of execution of the invention employs a check valve (101), equipped with a first threaded nipple (1) for attachment to the spray bar and liquid inlet, solidary to the body (3) of the anti-protection valve (2), having a second nipple (4), this one for attachment of said body to the angulator (102), containing an angle adjusting screw (5), and at the rotatable end couples the third threaded nipple (6), and in this third nipple (6) couples the curved finned rod (104), which receives the fourth nipple (7) in the fastener element (11), where the multiflow selector (103) is threaded, through the body (8), and when rotating the disc (9) of the multiflow selector the type of jet (10) is regulated.

The curved finned rod (104) employs the fastener element (11) capable of receiving the third and fourth nipples (6 and 7), where said fastener element is solidary with the curved rod (12), containing the various extension fins (13, 131, 132 and 133) and an induction ring (15) secured by means of screws (14).

The extension fins (13, 131, 132 and 133) show differences with respect to the separation distances between each other. The fins of type (13) are arranged orthogonally to the curved portion of the finned rod (104), separated from each other by a distance ($d_1$), while the fins of type (131, 132 and 133) are separated from each other by a distance ($d_2$) and are arranged in pairs and positioned next to the terminal portion of the rod (104).

The distance ($d_1$) between the fins of type (13) is greater than the distance ($d_2$) that exists between the fins of type (131, 132 and 133). That is, $d_1 > d_2$.

The length of the curved finned rod (104) may vary depending on the type of arrangement that applies to the complete nozzle. As well as the number of fins (13, 131, 132 and 133) and the curvature of the curved finned rod (104).

These parameters, length of the curved finned rod (104), number of fins (13, 131, 132, and 133), and rod curvature are determined from the capacity that insulates and cleans.

The invention claimed is:

1. An electrostatic spray head assembly for spraying liquid from an aircraft, comprising:

a check valve with an attachment nipple for attaching said check valve to the aircraft;

a multiflow selector coupled to said check valve, wherein said multiflow selector adjusts flow of said liquid through said electrostatic spray head;

an adjustable angulator disposed between said check valve and said multiflow selector for positionally adjusting said multiflow selector relative to said check valve;

an induction ring;

a finned rod having a curved section and a straight section, wherein said finned rod terminates at one end with a fastener element that joins said multiflow selector to said adjustable angulator, wherein said curved section curves ninety degrees from said fastener element to said straight section; and wherein said straight section supports said induction ring adjacent said multiflow selector.

2. The assembly according to claim 1, further including extension fins that are disposed on said curved section of said finned rod and on said straight section of said finned rod.

3. The assembly according to claim 1, wherein said adjustable angulator is threaded into said fastener element.

4. The assembly according to claim 2, wherein said extension fins on said curved section of said finned rod are arranged orthogonally to said curved section of said finned rod.

5. The assembly according to claim 2, wherein said extension fins on said curved section of said finned rod are spaced apart by a first distance.

6. The assembly according to claim 3, wherein said multiflow selector is threaded into said fastener element.

7. The assembly according to claim 3, wherein said adjustable angulator has an adjustment screw for setting an angle between said multiflow selector and said check valve.

8. The assembly according to claim 5, wherein said extension fins on said straight section of said finned rod are spaced apart by a second distance that is shorter than said first distance.

9. The assembly according to claim 5, wherein said extension fins on said straight section of said finned rod are arranged in pairs.

10. The assembly according to claim 9, wherein each of said pairs are spaced apart by a distance that is shorter than said first distance.

* * * * *